United States Patent
Chu

(10) Patent No.: US 9,664,314 B2
(45) Date of Patent: May 30, 2017

(54) VALVE CONNECTOR FOR A VALVE OF AN INFLATING DEVICE AND ADAPTER HAVING THE SAME

(71) Applicant: JIAO HSIUNG INDUSTRY CORP., New Taipei (TW)

(72) Inventor: Keng-Fong Chu, New Taipei (TW)

(73) Assignee: JIAO HSIUNG INDUSTRY CORP., New Taipei (TW)

( * ) Notice: Subject to any disclaimer, the term of this patent is extended or adjusted under 35 U.S.C. 154(b) by 0 days.

(21) Appl. No.: 14/830,369

(22) Filed: Aug. 19, 2015

(65) Prior Publication Data
US 2016/0061358 A1 Mar. 3, 2016

(30) Foreign Application Priority Data
Aug. 28, 2014 (TW) .............................. 103215421 U

(51) Int. Cl.
| | |
|---|---|
| *F16K 15/20* | (2006.01) |
| *F16L 15/04* | (2006.01) |
| *F16L 55/07* | (2006.01) |
| *F04B 33/00* | (2006.01) |
| *F04B 53/10* | (2006.01) |

(52) U.S. Cl.
CPC ............ *F16L 15/04* (2013.01); *F04B 33/005* (2013.01); *F04B 53/10* (2013.01); *F16K 15/20* (2013.01); *F16L 55/07* (2013.01); *Y10T 137/3584* (2015.04)

(58) Field of Classification Search
CPC .................................. F16K 15/20; F04B 33/00
USPC ............. 137/223, 231, 232, 233, 234, 234.5
See application file for complete search history.

(56) References Cited

U.S. PATENT DOCUMENTS

| | | | | | |
|---|---|---|---|---|---|
| 5,819,781 | A | * | 10/1998 | Wu ........................... | B60S 5/04 137/223 |
| 2011/0123262 | A1 | * | 5/2011 | Huang .................. | F04B 33/005 403/299 |
| 2012/0080099 | A1 | * | 4/2012 | Wang ...................... | B60S 5/043 137/223 |
| 2012/0125446 | A1 | * | 5/2012 | Chuang .................. | B60C 29/06 137/231 |

(Continued)

FOREIGN PATENT DOCUMENTS

| | | |
|---|---|---|
| TW | M426688 U | 4/2012 |
| TW | M439582 U | 10/2012 |
| TW | M466170 U | 11/2013 |

*Primary Examiner* — Kevin Murphy
*Assistant Examiner* — Paul J Gray
(74) *Attorney, Agent, or Firm* — Rabin & Berdo, P.C.

(57) ABSTRACT

A valve connector has a tubular body, a connection head, and an annular seal. The tubular body has at least one air inlet, an air outlet, and a first threaded hole. The first threaded hole is defined in the tubular body, communicates with the air outlet, and has a first thread specification and an inner diameter. The connection head is mounted detachably on the tubular body and has a second threaded hole and a recess. The second threaded hole has a second thread specification and an inner diameter larger than that of the first threaded hole. The recess is axially defined in the connection head and has an inner diameter larger than that of the second threaded hole. The annular seal is mounted in the recess in the connection head and is clamped between the tubular body and the connection head.

4 Claims, 3 Drawing Sheets

(56) References Cited

U.S. PATENT DOCUMENTS

2012/0234401 A1\* 9/2012 Wu ..................... F16L 37/00
137/231

\* cited by examiner

VALVE CONNECTOR FOR A VALVE OF AN INFLATING DEVICE AND ADAPTER HAVING THE SAME

BACKGROUND OF THE INVENTION

1. Field of the Invention

The present invention relates to a valve connector, and more particularly to a valve connector that can be connected with different types of valves of an inflating device.

2. Description of Related Art

An inflating device is applied to inflate an object, such as a ball, a tire, or an air balloon. However, to inflate different objects, different types of adapters for different valves are needed, so to carry and use different types of adapters for inflating different objects is troublesome. Therefore, an adapter that can be connected with different types of valves is provided.

Taiwan Utility Models No. M26688, M466170, and M439582 respectively disclose a conventional adapter for an inflating device that can be applied to different types of valves. The conventional adapters respectively have a seal mounted in the adapter to prevent leakage from occurring. However, the seal of the conventional adapter only abuts against an inner surface of the adapter and is easily pushed out of the adapter by the pressured air to cause air leakage. The conventional adapter has to be improved.

To overcome the shortcomings, the present invention tends to provide a valve connector to mitigate or obviate the aforementioned problems.

SUMMARY OF THE INVENTION

The main objective of the invention is to provide a valve connector that can be connected with different types of valves of an inflating device and provides an excellent leakage-proof effect.

The valve connector has a tubular body, a connection head, and an annular seal. The tubular body has a first end, a second end, an air channel, at least one air inlet, an air outlet, and a first threaded hole. The air channel is defined in the tubular body. The at least one air inlet is defined in the tubular body and communicates with the air channel. The air outlet is defined in the tubular body and communicates with the air channel. The first threaded hole is defined in the first end of the tubular body, communicates with the air outlet, and has a first thread specification and an inner diameter. The connection head is mounted detachably on the first end of the tubular body and has an inner end, an outer end, a second threaded hole, and a recess. The second threaded hole is defined through the inner end and the outer end and has a second thread specification and an inner diameter larger than that of the first threaded hole. The recess is axially defined in the inner end of the connection head, communicates with the second threaded hole, and has an inner diameter larger than that of the second threaded hole. The annular seal is mounted in the recess in the connection head and is clamped between the first end of the tubular body and the inner end of the connection head.

Other objects, advantages and novel features of the invention will become more apparent from the following detailed description when taken in conjunction with the accompanying drawings.

DETAILED DESCRIPTION OF PREFERRED EMBODIMENT

Figure 1:
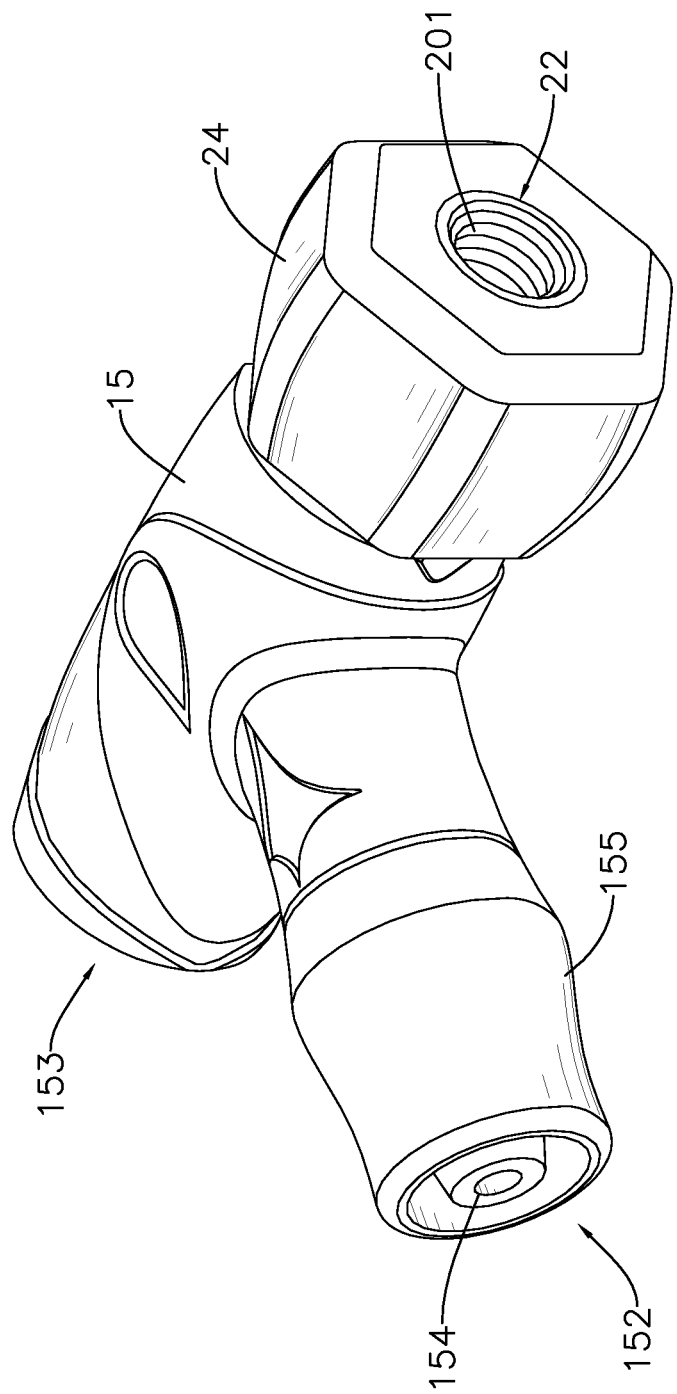
FIG. 1 is a perspective view of an adapter for an inflating device in accordance with the present invention.
Figure 2:
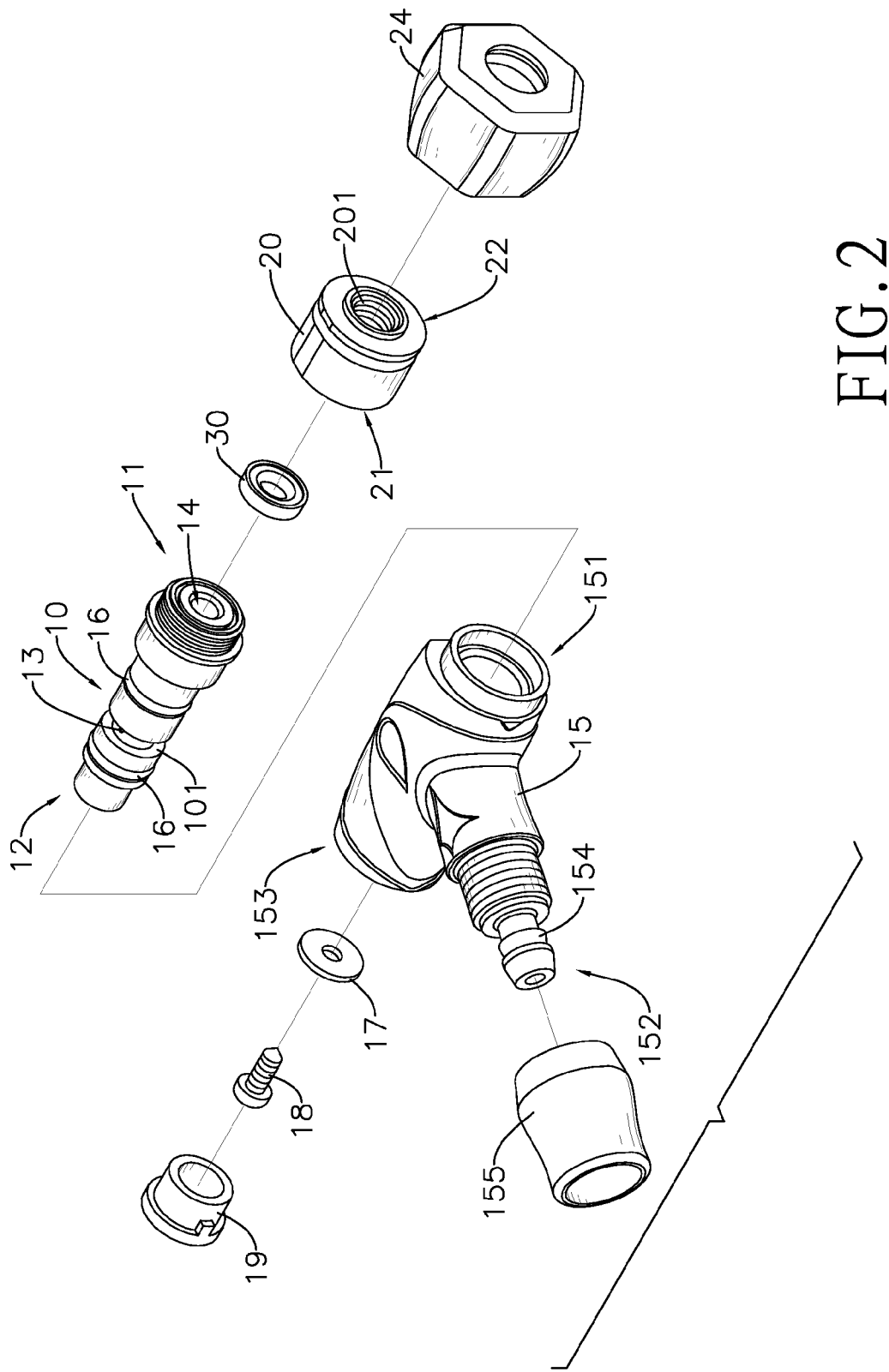
FIG. 2 is an exploded perspective view of the adapter in FIG. 1.

With reference to FIGS. 1 and 2, an adapter in accordance with the present invention comprises a valve connector and a casing 15. The valve connector comprises a tubular body 10, a connection head 20, and an annular seal 30.

The tubular body 10 comprises a first end 11, a second end 12, an air channel, at least one air inlet 13, an air outlet 14, and a first threaded hole 111. The air channel is defined in the tubular body 10. The at least one air inlet 13 is defined in the tubular body 10 and communicates with the air channel. Preferably, the tubular body 10 further has an annular groove 101 defined around an outer surface of the tubular body 10 and having a bottom, and two air inlets 13 are implemented, are defined through the bottom of the annular groove 101, and are diametrically aligned with each other. The air outlet 14 is defined in the tubular body 10 and communicates with the air channel. The first threaded hole 111 is defined in the first end 11 of the tubular body 10, communicates with the air outlet 14, and has a first thread specification and an inner diameter.

Figure 3:
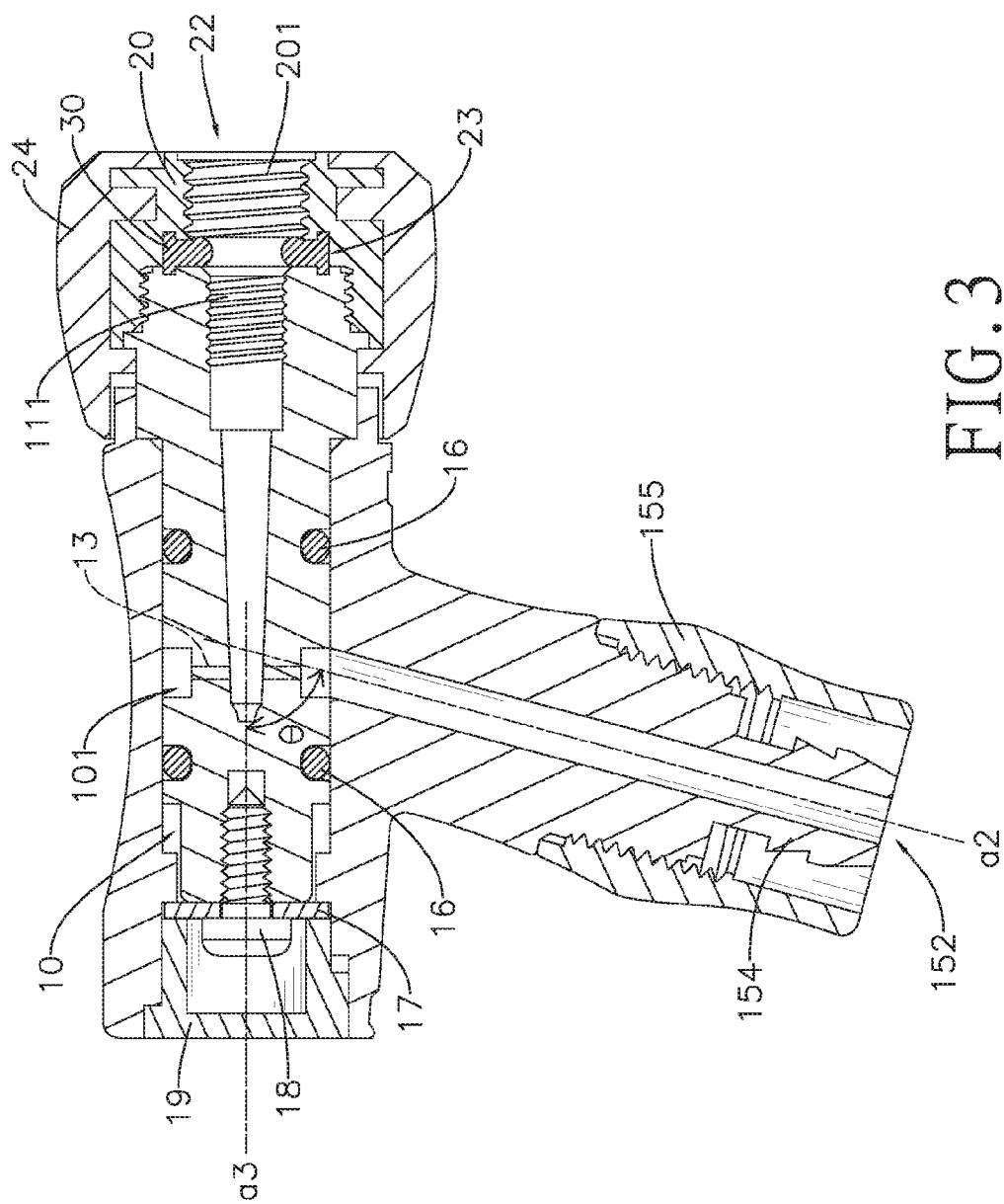
FIG. 3 is a cross sectional side view of the adapter in FIG. 1.

With reference to FIGS. 2 and 3, the connection head 20 is mounted detachably on the first end 11 of the tubular body 10, is preferably mounted on the first end 11 of the tubular body 10 by threading, and has an inner end 21, an outer end 22, a second thread hole 201, and a recess 23. The second threaded hole 201 is defined through the inner end 21 and the outer end 22 and has a second thread specification and an inner diameter larger than that of the first threaded hole 111. The recess 23 is axially defined in the inner end 21 of the connection head 20, communicates with the second threaded hole 201, and has an inner diameter larger than that of the second threaded hole 201. In addition, an outer cap 24 is mounted around the outer end 22 of the connection head 20.

The annular seal 30 is mounted in the recess 23 in the connection head 20 and is clamped between the first end 11 of the tubular body 10 and the inner end 21 of the connection head 20.

With reference to FIGS. 2 and 3, the casing 15 is hollow, is mounted around the valve connector and comprises two opposite ends, a first opening 151, a second opening 152, a third opening 153, a threaded rod 18, a washer 17, and a rear cap 19.

The first and third openings 151,153 are defined respectively in the opposite ends of the casing 15, and the second opening 152 is defined in the casing 15 and communicates with the at least one air inlet 13 in the tubular body 10. The third opening 153 has an axis a3 at an angle θ with respect to an axis a2 of the second opening 152. The first end 11 of the tubular body 10 extends out from the first opening 151 of the casing 15, and the connection head 20 is located outside the first opening 151 of the casing 15. The outer cap 24 has a length extending to the first opening 151 of the casing 15. In addition, multiple O-rings 16 are mounted around the tubular body 10 and are clamped between the outer surface of the tubular body 10 and an inner surface of the casing 15 to provide a sealing effect to the space formed between the tubular body 10 and the casing 15. The threaded rod 18 is mounted in the third opening 153, extends through the washer 17, and is screwed securely into the second end 12 of the tubular body 10. The rear cap 19 is mounted in the third opening 153 to close the third opening 153, is mounted around an end of the threaded rod 18, and abuts the washer 17.

The casing 15 further has a hose connecting head 154 formed on and protruding from the casing 15 at a position in which the second opening 152 is defined. A pressing sleeve 155 is detachably mounted on the casing 15 around the hose connecting head 154 and has an annular gap formed between the pressing sleeve 155 and the hose connecting head 154.

With such an arrangement, a Presta valve can be connected with the first threaded hole 111 in the first end 11 of the tubular body 10, or a Schrader valve can be connected with the second threaded hole 201 in the connection head 20. Accordingly, the adapter can be applied to inflate different objects with different types of valves. In addition, with the annular seal 30 clamped between the connection head 20 and the tubular body 10, the annular seal 30 can provide an excellent leakage-proof effect and can be prevented from being pushed out of the adapter even when high pressured air is fed into the adapter.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adapter comprising:
    a valve connector comprising
        a tubular body having
            a first end;
            a second end;
            an air channel defined in the tubular body;
            at least one air inlet defined in the tubular body and communicating with the air channel;
            an air outlet defined in the tubular body and communicating with the air channel; and
            a first threaded hole defined in the first end of the tubular body, communicating with the air outlet, and having a first thread specification and an inner diameter;
        a connection head mounted detachably on the first end of the tubular body and having
            an inner end;
            an outer end;
            a second threaded hole defined through the inner end and the outer end and having a second thread specification and an inner diameter larger than the inner diameter of the first threaded hole; and
            a recess axially defined in the inner end of the connection head, communicating with the second threaded hole, and having a diameter larger than the inner diameter of the second threaded hole; and
        an annular seal mounted in the recess in the connection head and clamped between the first end of the tubular body and the inner end of the connection head; and
    a casing being hollow, mounted around the valve connector, and comprising
        a first opening defined in the casing and from which the first end of the tubular body extends out; and
        a second opening defined in the casing and communicating with the at least one air inlet in the tubular body, wherein
        the tubular body further has multiple O-rings mounted around the tubular body and clamped between an outer surface of the tubular body and an inner surface of the casing;
    the casing further has two opposite ends, a third opening, a threaded rod, a washer, and a rear cap;
    the first and third openings are defined respectively in the opposite ends of the casing;
    the third opening has an axis at an angle with respect to an axis of the second opening;
    the threaded rod is mounted in the third opening, extends through the washer, and is screwed securely into the second end of the tubular body; and
    the rear cap is mounted in the third opening to close the third opening, is mounted around an end of the threaded rod, and abuts the washer.

2. The adapter as claimed in claim 1, wherein the casing further has a hose connecting head formed on and protruding from the casing at a position in which the second opening is defined.

3. The adapter as claimed in claim 2, wherein the casing further has a pressing sleeve detachably mounted on the casing around the hose connecting head and having an annular gap formed between the pressing sleeve and the hose connecting head.

4. The adapter as claimed in claim 3, wherein the connection head is mounted on the first end of the tubular body by threading, and is located outside the first opening of the casing; and
    an outer cap is mounted around the connection head.

* * * * *